No. 863,426. PATENTED AUG. 13, 1907.
C. NEWTON & F. E. BROWN.
TWO SPEED AND AUTOMATIC COASTER AND BRAKE HUB.
APPLICATION FILED JUNE 9, 1904. RENEWED JULY 1, 1907.
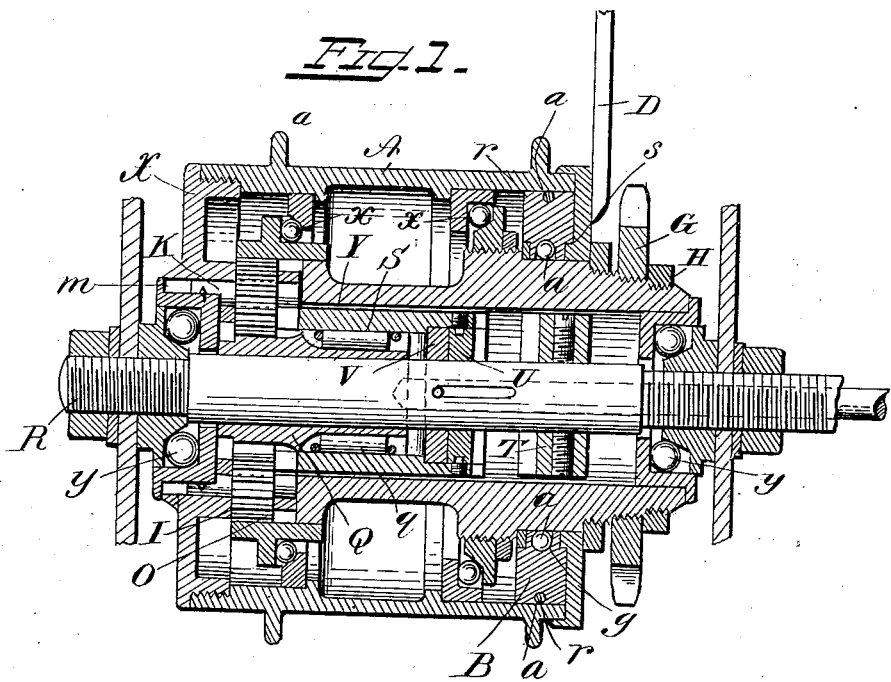
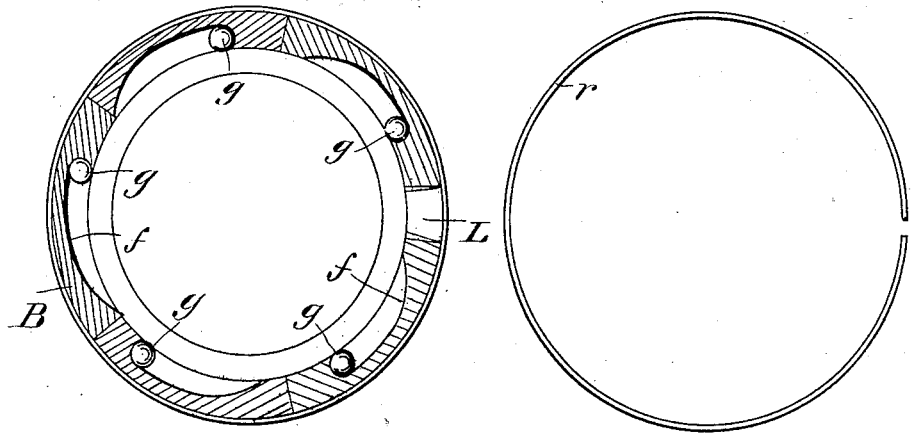
Witnesses
F. L. Durand
C. McNeil
Inventors
Charles Newton
Fred E. Brown
By Sturtevant & Greeley
Attorneys

UNITED STATES PATENT OFFICE.

CHARLES NEWTON AND FRED E. BROWN, OF TORRINGTON, CONNECTICUT, ASSIGNORS TO THE STANDARD SPOKE & NIPPLE COMPANY, OF TORRINGTON, CONNECTICUT, A CORPORATION OF MAINE.

TWO-SPEED AND AUTOMATIC COASTER AND BRAKE HUB.

No. 863,426.            Specification of Letters Patent.            Patented Aug. 13, 1907.

Application filed June 9, 1904, Serial No. 211,798. Renewed July 1, 1907. Serial No. 381,737.

*To all whom it may concern:*

Be it known that we, CHARLES NEWTON and FRED E. BROWN, citizens of the United States, residing at Torrington, in the county of Litchfield, State of Connecticut, have invented certain new and useful Improvements in Two-Speed and Automatic Coaster and Brake Hubs, of which the following is a description, reference being had to the accompanying drawing and to the letters and figures of reference marked thereon.

Our invention relates to improvements in hubs for bicycles, automobiles or other self or power propelled vehicles and as to general features is substantially as set forth in our application for patent of even date herewith No. 211,795.

The invention is illustrated in the accompanying drawings, in which,

Figure 1 is a view of the hub in central longitudinal section. Fig. 2, is a transverse view in section on line *a—a* of Fig. 1, showing brake shoe sections and balls for operating same, while Fig. 3 is a detail view of brake section retaining spring.

The two-speed and free-wheel mechanism is essentially the same as that of our former application consisting of the internal gear O, the pinions I meshing with said internal gear and being supported by pins K having bearings *m* in hub end X, of the central gear Q meshing with pinions and being free to revolve on stationary axle R, of the clutch sleeve S, surrounding said central gear, with rollers *q* in slots between same, of the collars U and V, the stationary clutch member T fast to the stationary axle R, and the shifting device all of which is substantially as described and claimed in above named application. The features which are novel in this improvement will now be described.

The objects of the improvement in addition to those of our former application are to provide an expansible brake wholly within the hub, the brake member being secured to a stationary part of the frame, and to provide a single sleeve, carrying at one end the sprocket and at the other end the internal gear so that a smaller sprocket may be used than would be possible with the former construction, and being so constructed that said sleeve does not interfere with the special two-speed mechanism.

In the drawings, A represents the hub shell which is supported on sleeve Y by ball bearings *x* said sleeve and hub being supported on the axle by bearings *y*. The sleeve Y carries at one end the sprocket G held in place by the check-nut H and at the other end carries the internal gear O, said internal gear meshing with pinions I carried by hub end X. The brake shoe is composed of sections B said sections being held together in circular form by retainer spring P, being held upon collar *r*, and flanges *s* of brake shoe arm D, which collar and flange prevent sections from being closed too far. The brake shoe sections are held against rotation by the lug or projection S, on brake shoe arm D. The brake shoe B being a stationary member, it follows that if the sprocket G and therefore the sleeve Y be rotated backwards as when back pedaling, the balls *g* will ride up the inclined faces *f* of the brake shoe sections thus expanding the brake shoe and causing the hub to be braked or brought to rest. When the sprocket and therefore the sleeve Y is again rotated forwards, the balls *g* will pass down the inclined faces *f* of sections and the retainer spring *p* will cause the brake shoe to contract, thus relieving the hub of brake. It will be seen, therefore, that we have a hub, giving a high speed, a low speed, an automatic coaster and a brake, as in our former application, said hub retaining many of the advantages as set forth in said application, and having also other advantages, peculiar to this construction, such as providing an expansible brake wholly within the hub, the brake member being secured to a stationary part of the frame, and to provide a single sleeve carrying at one end the sprocket and at the other end, the internal gear, so that a smaller sprocket may be used, than would be possible with the former construction, and being so constructed, that said sleeve does not interfere with the special two-speed mechanism.

Having thus fully described our invention, what we claim as new, and desire to secure by Letters Patent is:

1. In a device of the character described, a hub, a speed gear therein, an expansible brake contained wholly within the hub, and a single sleeve contained within the hub, and carrying at one end the sprocket, and at the other end having internal gear in operative connection with the speed gear of the hub and connections between the brake and the gear sleeve for expanding said brake, substantially as described.

2. The combination with the hub shell, speed mechanism contained therein, an internal rotating sleeve upon which the hub is rotatably supported, a sprocket carried upon one end of said sleeve, an expansible brake shoe surrounding the sleeve, with balls between the sleeve and the brake shoe, for expanding the brake when the sprocket is rotated backwards, an internal gear upon the inner end of the sleeve adapted to engage with the speed mechanism, substantially as described.

3. The combination with the hub shell, an internal rotating sleeve upon which the hub is rotatably supported, a sprocket carried upon one end of said sleeve, an expansible brake shoe surrounding the sleeve, with balls between the sleeve and the brake shoe, for expanding the brake when the sprocket is rotated backwards an internal gear upon the inner end of the sleeve, an end cap for the hub secured thereto, pinions carried thereby with which the internal gear engages, a central gear said pinions engaging the central gear, substantially as described.

In testimony whereof we affix our signatures, in presence of two witnesses.

CHARLES NEWTON.
FRED E. BROWN.

Witnesses:
S. R. SHEPARD,
E. L. FINN.